United States Patent [19]

Knuth

[11] 3,813,966
[45] June 4, 1974

[54] ELECTRICIANS WIRE STRIPPING TOOL

[76] Inventor: Everett F. Knuth, 814 16th Ave., N.E., Rochester, Minn. 55901

[22] Filed: Feb. 13, 1973

[21] Appl. No.: 332,231

[52] U.S. Cl.............................. 81/9.5 B, 30/279 R
[51] Int. Cl.............................................. H02g 1/12
[58] Field of Search....... 30/90.8, 90.9, 91.1, 279 R, 30/280; 81/9.5 R, 9.5 B, 9.5 C

[56] References Cited
UNITED STATES PATENTS

| 1,062,310 | 5/1913 | Waite | 30/280 X |
| 1,814,589 | 7/1931 | Endsley | 81/9.5 R |
| 2,627,768 | 2/1953 | Cook | 30/91.1 |
| 2,659,140 | 11/1953 | Davidson | 30/91.1 |
| 2,778,255 | 1/1957 | Miller | 81/9.5 R X |
| 2,783,798 | 3/1957 | Weinberger | 30/335 X |

*Primary Examiner*—Al Lawrence Smith
*Assistant Examiner*—K. J. Ramsey
*Attorney, Agent, or Firm*—John E. Becker

[57] ABSTRACT

An electrician's hand-operated cutter tool for simplifying and readily facilitating the removal of at least one side and preferably both sides or edges of the protective plastic sheathing or multiple wire electrical cable without damaging the electrical insulation on the individually insulated wires within various forms of feeder cable such as that designated in the trade as UF and NMC cable. The tool is designed to cut a relatively wide strip of the usually thermoplastic type of material which serves as a combined cable sheath and web separator between adjacently disposed multiple conductors and a ground wire, thereby making it relatively easy for the remaining sheath to be pulled away from the wires and excised at the starting point of the stripping cut. The tool is of diversified character so as to be able to selectively cut away both of the opposed wide flat sides, or only the opposed narrow sides of the cable in instances where the ground wire may be too closely disposed to the sheath covering that it interferes with or is subject to being seriously defaced or severed by the stripping action.

21 Claims, 8 Drawing Figures

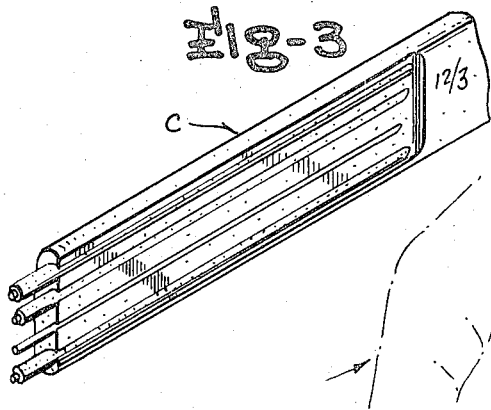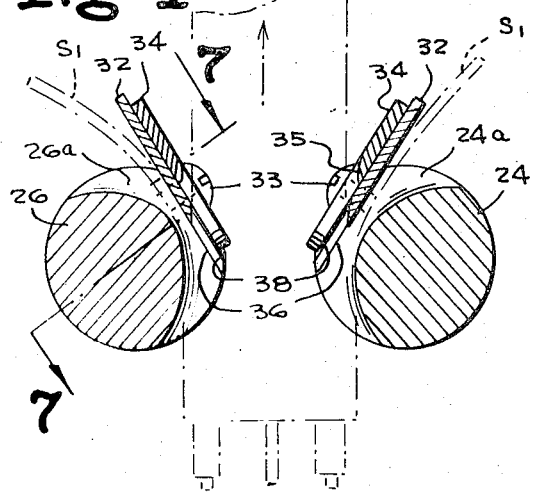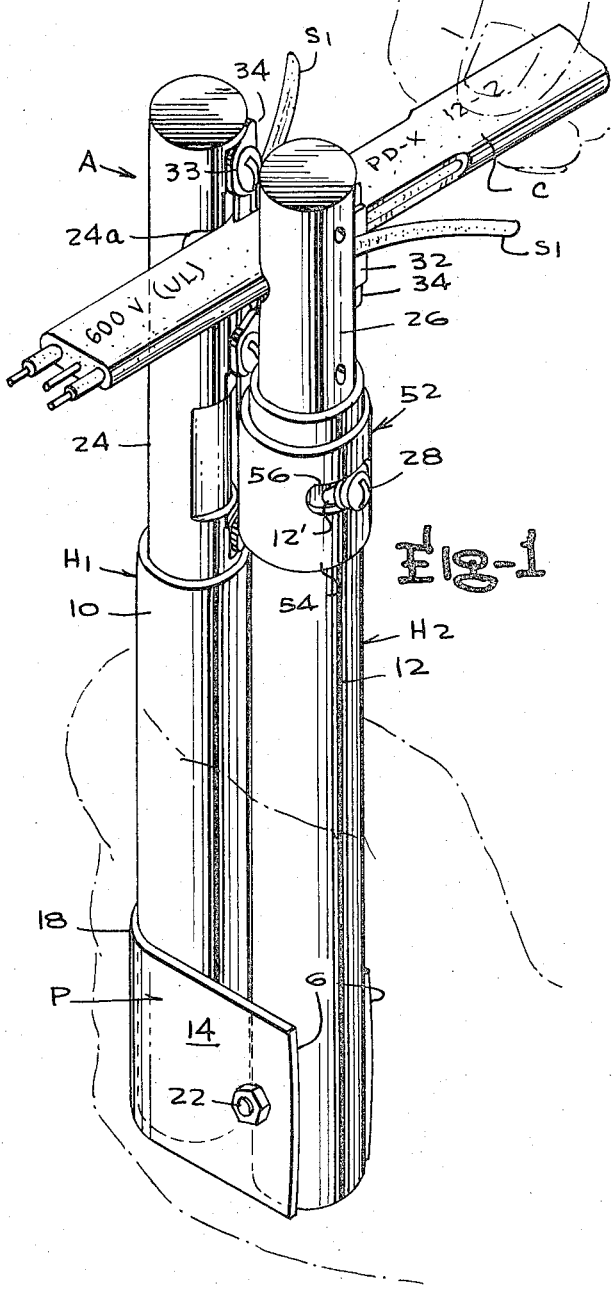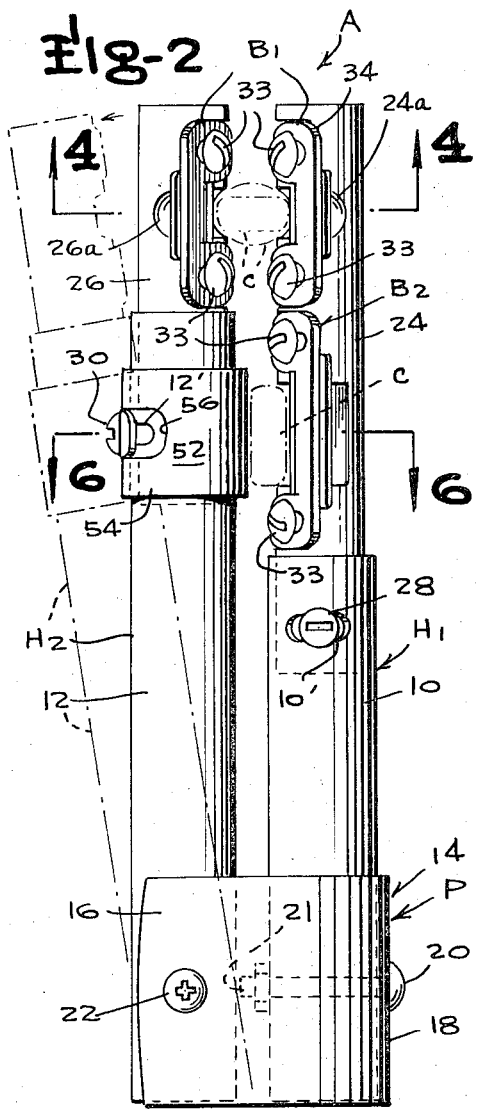

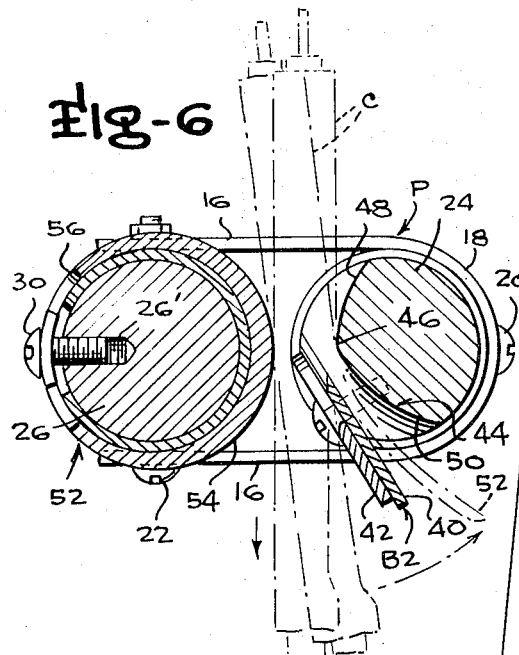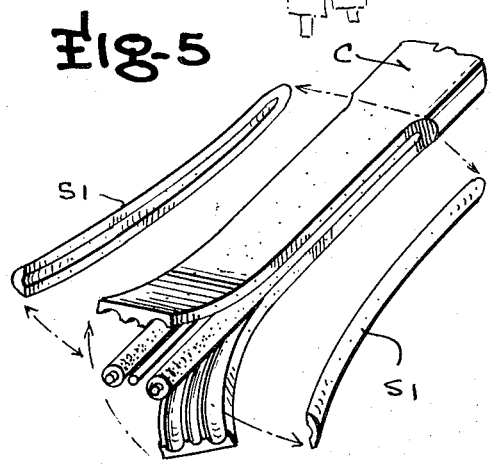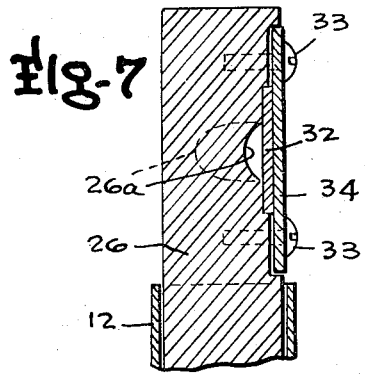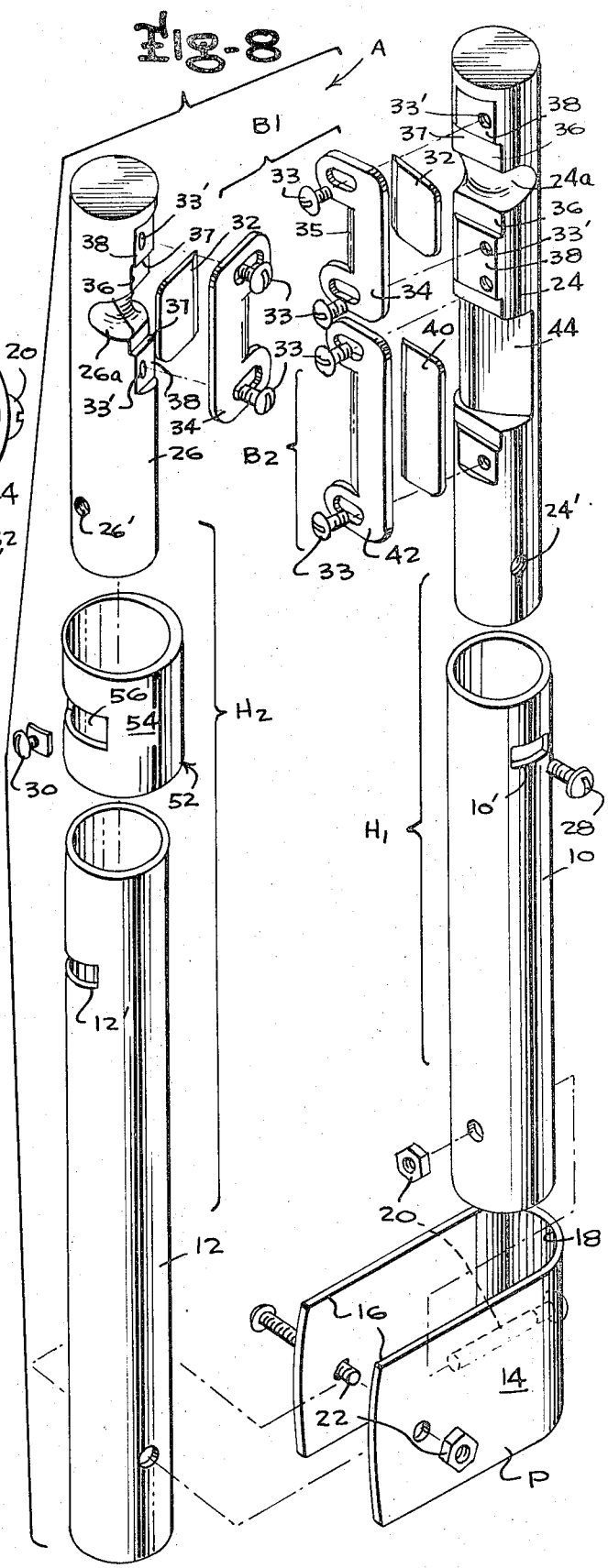

ELECTRICIANS WIRE STRIPPING TOOL

BACKGROUND OF INVENTION

This invention relates to a novel electrician's tool for stripping away portions of the outer protective sheathing, often formed of a thermoplastic or similar material, of multiple wire electrical cable embodying relatively rigid small diameter electrical conductor wires which are individually electrically insulated therein, and without damaging the individual wire insulation thereof.

With the advent of non-metallic sheathed electrical cable, the industry has produced a large variety of both two and three conductor cable, some of which is generally known as UF and NMC cable in the trade. The UF term generally denotes a form of underground feeder cable designed to withstand both above and below ground wetness and most soil acids when utilized in direct burial underground installations. It is also commonly used in above ground installations for wiring of both commercial and/or residential dwellings. The NMC cable is generally similar to the UF cable but is not usually used in direct burial installations.

The thermoplastic material used to sheath and separate pre-insulated conductor wires in such cable is extremely tough, durable, and very difficult to remove by ordinary tools or knives without inflicting damage to the insulation of individual conductor wires, and often cutting the bare grounding conductor usually embedded midway between a pair of the insulated wires. The base ground wire is usually of the same guage as the conductor wires and often is not centered but is embedded at the same relative depth as the insulated conductors on the flat side. This depth may be from approximately .015 – .020 inch deep.

Electricians have been in need of a hand tool that would effectively and quickly strip the sheath from UF and NMC cable at the point where it is terminated in outlet boxes, fittings or panelboards. In using such cable, electricians must generally remove about 6 to 8 inches of the cable sheath in order to connect the individual conductor wires to switches, receptacles or other wiring devices, as well as to make junction splices. During the wiring of an average house, electricians must remove the sheath from upwards of usually 80 terminations of this type of cable because of the multiplicity of outlets and switch boxes. When the cable is terminated at electrical panels, each cable so terminated must be stripped a distance of usually 2 or more feet so that the individual insulated conductor wires can be then connected to the circuit breakers or fuse holders. Accordingly, the electricians must spend at least 2 hours of expensive time to strip approximately 60 feet of the UF or NMC cable while wiring a modest size house, and perhaps 4–6 hours in stripping up to 150 feet for a larger house, particularly if it is properly wired for adequate use of today's various electrical appliances.

The three-wire cables are more difficult to strip due to their greater width, and many electricians accidentally cut or strip the insulation on the individual wires while attempting to remove the cable sheath with an ordinary knife. The damaged insulation must of course be repaired with electrical tape and this adds to the time required in wiring a building. With the high cost of skilled labor, any tool that saves time can cut the cost of a wiring job besides making the task easier and resulting in much better workmanship.

The noval cable stripper of this invention is that kind of tool as it can save over half the time ordinarily required by the use of a conventional knife. This tool will neatly cut the sheath on the wide, flat side of the cable, exposing the insulated as well as the bare grounding conductor so the remaining sheath can be easily pulled away from the wires and cut off at the point where the tool initiated the cut.

Since the thickness of the cable sheaths vary among different cable manufacturers, the depth of the bare grounding conductor in the sheath may also vary. In one sample of UF cable, the grounding conductor has been found to be closer to the surface than the insulated conductors, making it impracticable to use the wide blade of the cable stripper. For such a cable, two other cutters are provided in this tool to strip the narrow edges of the cable in a single motion, thus exposing outermost insulated wires. With this done the remaining flat sides of the sheath can be easily pulled back from the two or three wires and then cut off.

Accordingly, it is an object of the present invention to provide such a long needed, novel hand tool which will overcome the foregoing shortcomings and enable electricians to effectively and quickly strip the tough non-metallic sheating from such UF and similar types of cable.

Another object is to provide such a tool which is of a novel construction enabling it to be used to selectively effect stripping of different types and sizes of the related forms of cable, and to selectively and uniformly strip one or both sides thereof as desired.

Still another object is to provide a tool of the foregoing character which has adjustable characteristics to facilitate its stripping to different depths as may be required for sheaths of different thickness.

Yet a further object is to provide such a tool which is of relatively simple construction and which may be relatively inexpensively manufactured and sold.

BRIEF SUMMARY OF INVENTION

The foregoing objects are achieved by the provision of a pair of pivotally connected composite handle members having thereon at least one pair of coacting adjustable blades and at least one further adjustable blade, all disposed preferably toward the non-pivoted ends of said members, for performing a selected stripping of either the opposed narrow sides of the cable, or a wide flat side thereof. An opposed pair of blades, preferably for cutting the narrow sides of a cable, is disposed at an acute angle relative to the user of the tool as it is held in his hand, and the mounting means for the blade or blade end of the handle means, includes adjustment means for selectively effecting the relative angle of the blades and the depth of their cut. At least one further longer blade and an adjustable coacting opposed sleeve are provided preferably adjacent to the first-mentioned blades and are constructed and disposed to effect a uniform stripping of a substantially full width flat strip or section from one wide flat side at a time of the cable.

Cable entry and guide notches are disposed in conjunction with the blades on the handle members to facilitate guiding not only of the basic cable therethrough but also to channel away the stripped or cut portions of the sheath material, responsive to the cable being pulled through the tool by the free hand not used to grip the tool handles together in a coacting relationship. The blades are not only adjustable, but are also readily removable for sharpening and/or replacement as needed. The stripping may be effected equally well at either end or at an intermediate portion of the cable, the latter being in the event a "tap in" is necessary.

The foregoing and other objects and advantages of the novel tool hereof will become more apparent from the following detailed description of one practical form, taken in conjunction with the annexed illustrative drawing figures.

BRIEF DESCRIPTION OF DRAWINGS

FIG. 1 is a perspective view of my novel tool shown in the process of stripping the narrow sides of a piece of UF cable responsive to being drawn through the tool;

FIG. 2 is a front elevational view of the tool as viewed from the side opposite that as shown in FIG. 1;

FIG. 3 is a perspective view of a fragmentary piece of a form of UF cable shown with the wide side stripped away by my novel tool;

FIG. 4 is an enlarged horizontal cross-sectional detail view taken substantially on line 4—4 of FIG. 2, for cutting away the narrow sides of a length of cable;

FIG. 5 is a perspective view of a fragmentary piece of UF cable shown being desheathed after the narrow sides of the cable have been stripped away;

FIG. 6 is an enlarged horizontal cross-sectional detail view as taken substantially on line 6—6 of FIG. 2 showing how the wide side of a length of UF cable is stripped therefrom;

FIG. 7 is an enlarged vertical cross-sectional detail view taken substantially on line 7—7 of FIG. 4; and FIG. 8 is a perspective view showing the tool components in an exploded disassembled relationship.

DETAILED DESCRIPTION OF A PREFERRED FORM

Referring to the drawings, like reference characters designate like parts throughout the several figures, wherein the tool assembly is generally designated A, and briefly comprises a pair of coacting composite elongated handle sub-assemblies H1 and H2 pivotally connected together at one end by any suitable pivot bracket and pivot pin means generally designated P. The handle sub-assemblies each further comprise first and second blade means including a complementary end pair constituting the first blade means and generally denoted B1, and the adjacent blade means generally denoted B2 for selectively stripping either the opposed narrow sides of a flat side respectively of the cable designated C, responsive to the handles being gripped together in one hand, as shown in FIG. 1, and the cable being drawn therethrough with the other hand.

More specifically, the composite handle sub-assemblies H1, H2 each include basic handle portions 10 and 12 respectively. While said basic handles 10 and 12 are shown to be of tubular form, and may be fabricated from lengths of standard 5/8 inch diameter; thin wall electrical conduit, they also may have any other suitable form. Various suitable means may be utilized to pivotally connect said handles. One feasible form is the use of the pivot bracket means P, which includes a U-shape sheet material bracket 14 having flattened leg members 16 connected by a bight portion 18. The bight portion is complementally formed to snugly receive the lower end of handle 10 and preferably is rigidly attached thereto by a machine screw and nut assembly 20, the screw being of a length to serve also as a stop member to limit the extent of opening of the handles, as will become more apparent hereinafter. The lower end of the other handle 12 is suitably pivotally connected between the leg members 16 as by means of another machine screw and nut assembly 22 passing through aligned apertures in the leg members 16.

The composite handle sub-assemblies further comprise separable blade-mounting members 24 and 26 fabricated preferably of solid round stock material and adapted for a slip fit within the tubular basic handles 10 and 12 respectively, as shown. Members 24 and 26 are each provided with a tapped hole 24' and 26' respectively near their lower ends, which holes are adapted to receive set screws 28 and 30 after being aligned with partial circumferential slots 10' and 12' provided respectively in the upper portions of the basic handles 10 and 12. It is apparent that screws 28 and 30 hold the handle members together, while the slots 10' and 12' provide for selective relative rotation between the respective handle components to facilitate angular adjustment of the blade means B1 and B2 relative to each other as well to the sides or edge of the various cable C.

Handle members 24 and 26, near their uppermost free ends, are provided with complemental transverse cable-receiving grooves 24a and 26a respectively, which extend partially around the circumference of each member and which grooves are adapted to face one another when in the assembled relationship on the tool. Each of the grooves 24a, 26a, while shown to be of generally arcuate form in the cross-section of FIG. 4, it may be of more pronounced angular configuration as formed by groove segments disposed about 90° relative to one another and having a noticeable apex which would be in the area generally directly beneath the blades cutting edge and where the sides of the cable would tangentially engage the grooves. A similar groove with apex form is depicted in association with another groove and blade means in the right hand side of FIG. 6, to be described hereinafter. The grooves 24a and 26a may be of approximately 5/16 inch wide along most of their medial portions and at their general midpoint or aforementioned apex area have a depth of approximately 3/32 inch below the peripheral surface of the handle members 24 and 26. The grooves will be seen to have two functions, namely to provide an entry guide for generally the narrow side edges of a cable, up to the medial throat or apex-like area beneath the blades, and thereafter the rest of the groove providing the throat and continuing guide way through which pass the thin strips S1 (FIGS. 1 and 4) of sheating that is cut away as the cable passes through the blade means of the tool. The entry part of the grooves are preferably not cut as deeply as the exit part thereof, the latter of which may be 3/16 inch deep while the former may be approximately only 3/32 inch deep.

The first blade means B1, which are associated with the aforesaid grooves 24a and 26a, comprise preferably a pair of generally identical planar blades 32, 32 and slightly larger blade-retaining members 34, 34. The blades and their holding members are adapted to bridge the grooves 24a and 26a, and to be received respectively upon complemental first and second slightly stepped parallel flat surfaces 36 and 38 respectively, of which spaced portions at opposite sides of the groove of the each surface 36 and 38 are respectively coplanar. The flat surfaces 36 and 38 are generally centered over the grooves, are of different overall lengths, and are of different depths, as shown. The shorter composite flat surfaces 36 are seen to correspond in length generally to that of the blades 32 so as to receive them within and center them against the shoulders 37 which form the step between the surfaces 36 and 38. The longer composite flat surfaces 38 are slightly longer than the blade retainers or blade holding members 34 so as to fully receive and seat them in superposed relation upon the blades 32. Blade retainers 34 preferably have elongated mounting holes in the opposed winged ends and are held in place preferably by the opposed vertically spaced machine screws 33, or any other suitable means. The blade-receiving flat seat 36 is of sufficient lateral extent to permit the blades 32 to be adjustably shifted thereon to vary the depth of cut. The blade seats 36 are of slightly less depth than the thickness of the blade to assure that the blade will be firmly held by the blade retainer 34 when the machine screws 33 are tightened.

In the illustrative form the separate blade retainers 34 are of generally U-shape in plan view, with a cut away medial portion defining the winged ends for receipt of the fastener screws 33. This cut away medial portion provides for unobstructed passage of the main body of the cable as it traverses the cutters, as better seen in FIGS. 2 and 4. Also said medial portions are preferably slightly beveled or rounded at their inside areas, as shown at 35, to help assure a uniform depth of cut, in conjunction with the retainer and blade adjustability as provided by the slot type screw holes in the opposite or winged end portions of said blade retainers 34. An example of the cooperative relationship of the cable bearing against the medial beveled are 35 is shown in FIG. 6 by the dashed line showing of the cable.

As illustrated the threaded screwholes 33' for receiving screws 33 are located near one side edge of the flat surfaces 38 to contribute to greater adjustability, as well as to locate the screws in a non-interfering manner when the tool is in use. Flathead screws may be used in lieu of roundhead screws to reduce clearance also. It is apparent that upon loosening of the screws 33, the blades 32 and 34 may be shifted inwardly, or downwardly as viewed in FIG. 4, to effect a deeper cut, and vice versa. It is also apparent that this construction enables the blades to be readily removed for sharpening and replacement if they should break. As an alternate blade construction, the blade and retainers may be made as a single or integral piece.

Proceeding to the second blade means B2, it is mounted upon blade-mounting member 24 by more screws 33 in essentially the same manner as but spaced adjacently below the cutter blade 32 and its retainer 34 thereabove. Second blade means B2 includes preferably the same type but a substantially longer blade 40 and correspondingly longer blade retainer 42, both of which span or bridge a related transverse groove or recess 44 provided in the blade-mounting member 24 and spaced below the aforedescribed groove 24a. Groove 44 is more noticeably rectangular in form and considerably greater longitudinal extent along member 24 than is the groove 24a, and is seen to coact with the longer blade 40 to accomodate and to effectively strip the unwanted sheathing from the wide flat side of a piece of cable C.

Recess or groove 44, as shown in FIG. 6, may be of generally right angular form in cross-section, having a slightly rounded apex 46 at the smooth juncture of the shallower inlet groove portion 48 and the deeper outlet or exit groove portion 50. Exit portion 50 serves generally the same purpose as the exit side of the grooves 24a and 26a. That is, it forms a throat to first receive and then guide away the stripped wide flat section of sheathing S2 (FIG. 6) as the cable is passed therethrough. In this preferred embodiment only one of the longer blades 40 is utilized, because the cable can be passed through twice to sequentially cut away both wide flat sides. And upon the stripping away the outer sheathing of essentially the full width of the wide flat sides of the cable thereby exposing for the desired length the non-damaged insulated conductor wires, and bare ground wire usually therebetween, it is relatively easy for the electrician to then pull the insulated conductor wires free of the intermediate webbing of sheathing material. Moreover, the use of a single blade 40 permits it to be used in conjunction with an adjustable cable gripping means 52 now to be described, and which also serves to vary the depth of the cut on the flat side of the cable.

In this illustrated form, the combined cable gripper and depth-of-cut adjuster means 52 is shown to comprise a rotatable arcuate sleeve body 54 provided with a sliding fit upon the outer periphery of handle 12. The handle portion 12 is longer than the other handle 10 for this purpose. Likewise, blade mounting member 26 is substantially shorter than the other member 24, the latter of which necessarily is longer to accomodate both sets of blades.

The sleeve body 54 has a non-uniform wall thickness, being of generally a uniform eccentric construction, as better seen in FIGS. 6 and 7. The thinner wall portion is provided with a medial transverse slotway 56 which is of a narrow dimension adapted to slidably receive therein the screw head and washer of the aforedescribed set screw 30, after the assembly of said sleeve body 54 upon the handle 12. Slotway 56 is of sufficient lateral extent to provide the desired range of adjustment for the increasingly thicker wall sections of the sleeve to be adjustably disposed according to the desired depth of cut needed to expose the pre-insulated wires beneath the flat wide side of cable sheathing. It is apparent that the sleeve body 54 will firmly hold the wide side of the cable against the longer blade 40 of the second blade means B2 during stripping of the sheathing. The adjustment feature is exceptionally helpful because of variations in thickness of the sheating of cable made either by different manufacturers or for different application purposes.

While the adjuster means 52 is shown as a full sleeve, it is apparent that in variations thereof it could comprise only a partial arcuate segment, or a tapered linear shim-like segment slidable in a suitable bracket. The adjuster means 52, like the blades and blade retainers, as well as the complete tool, are preferably made of steel or other suitable metal, although the sleeve body 54 might be fabricated of a hard plastic-like material.

While the foregoing description has been made more particularly relative to the stripping of the flattened form of nonmetallic sheathed cable, it is to be understood that the first blade means B, with its generally arcuate coating grooves 24a and 26a, is purposely designed to also strip away segments of sheathing from a more circular cross-sectional form of cable, one form of which is referred to as NM cable. The NM cable also differs from the UF and NMC cables in that the individual insulated conductors are not completed surrounded by the thermoplastic material which forms the cable sheath. Twister paper fillers separate the conductors in NM cables to maintain almost the same overall shape in the two-wire assembly as UF and NMC cable. The three-wire NM cable is round instead of the flat configuration of UF and NMC cable. Usually the various types of cable are also color coded to help distinguish one type from another.

The foregoing described tool has been found to work exceptionally well with all three types of cable, and particularly with the No. 14, No. 12, and No. 10 sizes which are more frequently used sizes. The tool can be adapted for all types and sizes of such cable.

In view of the preceding detailed explanation, the operation is believed to be fully apparent and need not be repeated in a detailed summary thereof. It is also apparent that the cable may be passed through the tool either by a push or pulling motion, or sequential combinations thereof.

The use of a predetermined length of machine screw and nut assembly 20 to secure the bight portion of the pivot bracket to handle 10 is desirable so that the innermost end 21 (FIG. 2) of the screw can serve as an abutment for the adjacent end portion of the handle 12 to limit the extent of opening between the blade means. In lieu of the illustrated yoke or U-shape form of pivot bracket P, it is understood that other suitable hinged connections may be utilized. On such non-illustrated form may include adjacently disposed tongue-like hinge members projecting from the body members generally coplanar with the axis of each handle. Such tongue-like members may include on one handle member a pair corresponding to the leg members 16, but spaced apart only sufficiently to pivotally receive therebetween the thickness of a single tongue member on the other handle member.

While in the foregoing one particularly practical embodiment of the invention has been disclosed, it is apparent that the specific details of the apparatus shown are merely by way of a feasible example, and the subject invention may take other forms and embodiments within the spirit of the disclosure and within the scope of the appended claims.

What is claimed is:

1. A hand tool for effecting uniform stripping of nonmetallic outer sheathing or the like from around various types of electrical feeder cable including cable types of both generally circular cross-section and flattened generally rectangular cross-section having relatively closely opposed flat sides and both embodying multiple individually insulated electrical conductor wires and usually a bare ground wire therein, without damaging either the insulation of the individual conductor wires or the bare gound wire, responsive to passing said cables therethrough from an infeed side to an output side, said tool comprising in combination:

a. handle means including a pair of elongated handles with means pivotally connecting them together adjacent one end for opening and closing movement of opposite free ends relative to one another and to a piece of cable related thereto with said handles being generally parallel when in the stripping condition, b. first and second blade means attached upon said handle means and in longitudinally spaced apart relation toward free ends of said handles which are not pivotally connected together, c. said first and second blade means disposed complementally adjacent to cable-receiving-and-guiding recesses formed in said handle means transversely to their length, d. said first and second blade means and their respectively associated recesses being of substantively different relative sizes and so related to each other and to said handles such that said first blade means is utilizable to selectively cut and strip away opposite sides of the circular type cable sheathing and to also cut and strip away only the opposed narrow side edges of sheathing of the flattened generally rectangular cross-sectional type cable, whereas said second blade means and associated recess are longitudinally elongated and generally parallel, said second blade means being selectively utilizable to cut and strip away sheathing of the more relatively closely opposed flat sides of said flattened type cable, and e. said first and second blade means each including at least one cutting blade having a cutting edge disposed parallel to a longitudinal axis of said elongated handles, and said blades being angled obtusely relative to a length of cable entering said infeed side of the tool.

2. A hand tool for effecting uniform stripping of nonmetallic outer sheathing or the like from around various types of electrical feeder cable embodying multiple individually insulated electrical conductor wires and usually a bare ground wire therein, without damaging either the insulation of the individual conductor wires or the bare ground wire, responsive to passing said cables therethrough from an infeed side to an output side, said tool comprising in combination:

a. handle means including a pair of elongated handles with means pivotally connecting them together adjacent one end for opening and closing movement of opposite free ends relative to one another and to a piece of cable related thereto with said handles being generally parallel when in the stripping condition, b. first and second blade means attached upon said handle means toward free ends of said handles which are not pivotally connected together, c. said blade means disposed complementally adjacent to cable-receiving-and-guiding recesses formed in said handle means transversely to their length, d. said first and second blade means each including at least one cutting blade having a cutting edge disposed parallel to a longitudinal axis of said elongated handles, and said blades being angled obtusely relative to a length of cable entering said infeed side of the tool.

e. and wherein said handles are each of composite form and each includes a basic handle portion at the pivotally joined end and a separable blade-mounting portion disposed toward and constituting the free, non-pivotal end portion of said handle; cooperative means on said respective handle portions to facilitate selective adjustment of said separable blade-mounting portion so as to vary the blade angle relative to said cable passing through the tool.

3. A hand tool as defined in claim 2 wherein said handles are of circular cross-section, said basic handle portions each being of cylindrical tubing form open to coaxially and telescopically receive respectively said separable blade-mounting portions; and said blade-mounting portions being selectively adjustable about their axes, and with fastener means comprising part of the cooperative means of a paragraph (e) on said respective handle portions to facilitate the said selective adjustment thereof.

4. A tool as defined in claim 2 wherein said cable-receiving-and-guiding recesses are formed in said separable blade-mounting portions of said handle means beneath said attached blades, and extend circumferentially sufficiently to also provide exit guideways together with said blade means for the cut-off strip portions of said sheathing material.

5. A tool as defined in claim 2, wherein said blade means include means for adjustably and removably mounting said blades to facilitate depth-of-cut-adjustment, and sharpening and replacement respectively of said blades.

6. A tool as defined in claim 5, wherein said blade means and adjustable mounting means therefor include first and second parallel but complementally stepped flat surfaces for receiving generally planar blade and superposed blade-holding members, the latter of which overlies said blade and has fastening means associated therewith to removably attach said blade holding member to said separable handle portion.

7. A tool as defined in claim 6 wherein said first blades includes a pair of substantially identical blade means and related blade-holding members, said pair disposed one upon each handle in complementally laterally opposed relation to each other and to correspondingly formed recesses for each blade, to provide for simultaneous cutting of opposite side edges of said cable as passed therethrough.

8. A tool as defined in claim 2 wherein said first blade means includes a pair of substantially identical generally planar blade members adjustably disposed one upon each handle in complementary laterally-opposed angular relation to each other and to a corresponding pair of said cable-receiving-and-guiding recesses, to facilitate simultaneous stripping of a pair of opposite sides of said cable.

9. A tool as defined in claim 8 wherein said cable to be stripped in one form is of generally flattened character having an opposed pair of relatively flat and wide sides and an opposed pair of narrower edge sides, said first blade means and corresponding recesses are disposed closely adjacent said handle free ends, and said recesses associated with said pair of blades of the first blade means are of generally arcuate cross-sectional form, and said blades and associated recesses of said first blade means are of substantially lesser longitudinal extent than the blade and associated recess for said second blade means, said first blade means and related recesses adapted to receive and strip the sheathing from the narrower edge sides of the cable.

10. A tool as defined in claim 2, wherein said cable to be stripped in one form is of generally flattened character having an opposed pair of relatively flat and wide sides and an opposed pair of narrower edge sides, said blade of said second blade means and the related recess are provided on only one of said handles and are of longer longitudinal extent thereon than that of said first blade means and its related recess, said second blade and related recess adapted to receive and strip the sheathing from one of said relatively wide and flat sides of said cable, whereas said first blade means and related recesses are adapted to receive and strip sheathing from the narrower edge sides.

11. A tool as defined in claim 1, wherein said blade means include means for adjustably and removably mounting said blades to facilitate depth-of-cut-adjustment, and sharpening and replacement respectively of said blades.

12. A tool as defined in claim 1 wherein said means for pivotally connecting said handles together include a bracket member having a body portion with one side fixedly connected to one of said handles and bridging the pivotally connected ends, and pivotally connected with the other of said handles by a transverse pivot pin passing through said body portion, said pivot pin extending at least partially into said adjacent handle.

13. A tool as defined in claim 12, wherein said bracket member is of U-shape and includes bight-connected opposed flattened leg members constituting part of said body portion both of which leg members bridge said pivotally connected handles, with said bight portion complementally and fixedly engaging one handle, and said pivot pin passing through aligned apertures in said bracket legs and also through the other of said bundles.

14. A tool as defined in claim 13, further including means associated with said bracket and handles to limit the extent of opening of the free ends of said handles.

15. A tool as defined in claim 1 wherein said first blade means includes a pair of substantially identical generally planar blade members adjustably disposed one upon each handle in complementary laterally-opposed angular relation to each other and to a corresponding pair of said cable-receiving-and-guiding recesses, to faciliate simultaneous stripping of a pair of opposite sides of said cable.

16. A tool as defined in claim 1, wherein said blade of said second blade means and the related recess are provided on only one of said handles and are of longer longitudinal extent thereon than that of said first blade means and its related recess, said second blade and related recess adapted to receive and strip the sheathing from one of said relatively wide and flat sides of said cable.

17. A tool as defined in claim 1, wherein said blade means include means for adjustably and removably mounting said blades to facilitate depth-of-cut-adjustment, and sharpening and replacement respectively of said blades, and wherein said blade means and adjustable mounting means therefor include first and second parallel but complementally stepped flat surfaces for receiving generally planar blade and superposed blade-holding members, the latter of which overlies said blade and has fastening means associated therewith to removably attach said blade-holding member to said separable handle portion.

18. A tool as defined in claim 17 wherein said first blade means includes a pair of substantially identical blade means and related blade-holding members, said pair disposed one upon each handle in complementally laterally opposed relation to each other and to correspondingly formed recesses for each blade means, to provide for simultaneous cutting of opposite side edges of said cable as passed therethrough.

19. A tool as defined in claim 1 wherein said first blade means includes a pair of substantially identical blade means and related blade-holding members, said pair disposed one upon each handle in complementally laterally opposed relation to each other and to correspondingly formed recesses for each blade means, to provide for simultaneous cutting of opposite side edges of said cable as passed therethrough.

20. A hand tool for effecting uniform stripping of nonmetallic outer sheathing or the like from around various types of electrical feeder cable embodying multiple individually insulated electrical conductor wires and usually a bare ground wire therein, without damaging either the insulation of the individual conductor wires or the bare ground wire, responsive to passing said cables therethrough from an infeed side to an output side, and wherein said cable to be stripped in one form is a generally flattened character having an opposed pair of relatively flat and wide sides and an opposed pair of narrower edge sides, said tool comprising in combination:
   a. handle means including a pair of elongated handles with means pivotally connecting them together adjacent one end for opening and closing movement of opposite free ends relative to one another and to a piece of cable related thereto with said handles being generally parallel when in the stripping condition,
   b. first and second blade means attached upon said handle means toward free ends of said handles which are not pivotally connected together,
   c. said blade means disposed complementally adjacent to cable-receiving-and-guiding recesses formed in said handle means transversely to their length,
   d. said first and second blade means each including at least one cutting blade having a cutting edge disposed parallel to a longitudinal axis of said elongated handles, and said blades being angled obtusely relative to a length of cable entering said infeed side of the tool,
   e. said blade of said second blade means and the related recess being provided on only one of said handles and adapted to receive and strip the sheathing from one of said relatively wide and flat sides of said cable, and
   f. further including adjustable cable-engaging means disposed on said other handle not having said second cutting means, and disposed laterally opposite said second cutting means, said adjustable cable-engaging means including a body of variable thickness to be adjusted to vary the depth of cut and to compensate for different cable thickness and to frictionally engage the other wide flat side of said cable during a stripping action or use of the tool.

21. A tool as defined in claim 20, wherein said handle on which said adjustable cable-engaging means is disposed is of at least partial arcuate cross-section, and said cable-engaging means includes a sleeve member of correspondingly arcuate form and concentrically rotatably disposed on said handle, said sleeve member constituting the aforesaid body of variable thickness and adapted to be selectively rotated on said handle so as to dispose a predetermined thickness portion of said sleeve body adjacent to and for effectively varying the depth of cut and for assuring frictional engagement against said other flat cable side during stripping use of said tool.

* * * * *